Oct. 23, 1934. J. F. ARTHUR 1,978,290
RACK FOR SUPPORTING PIPE FITTING NIPPLES
Filed Jan. 7, 1932
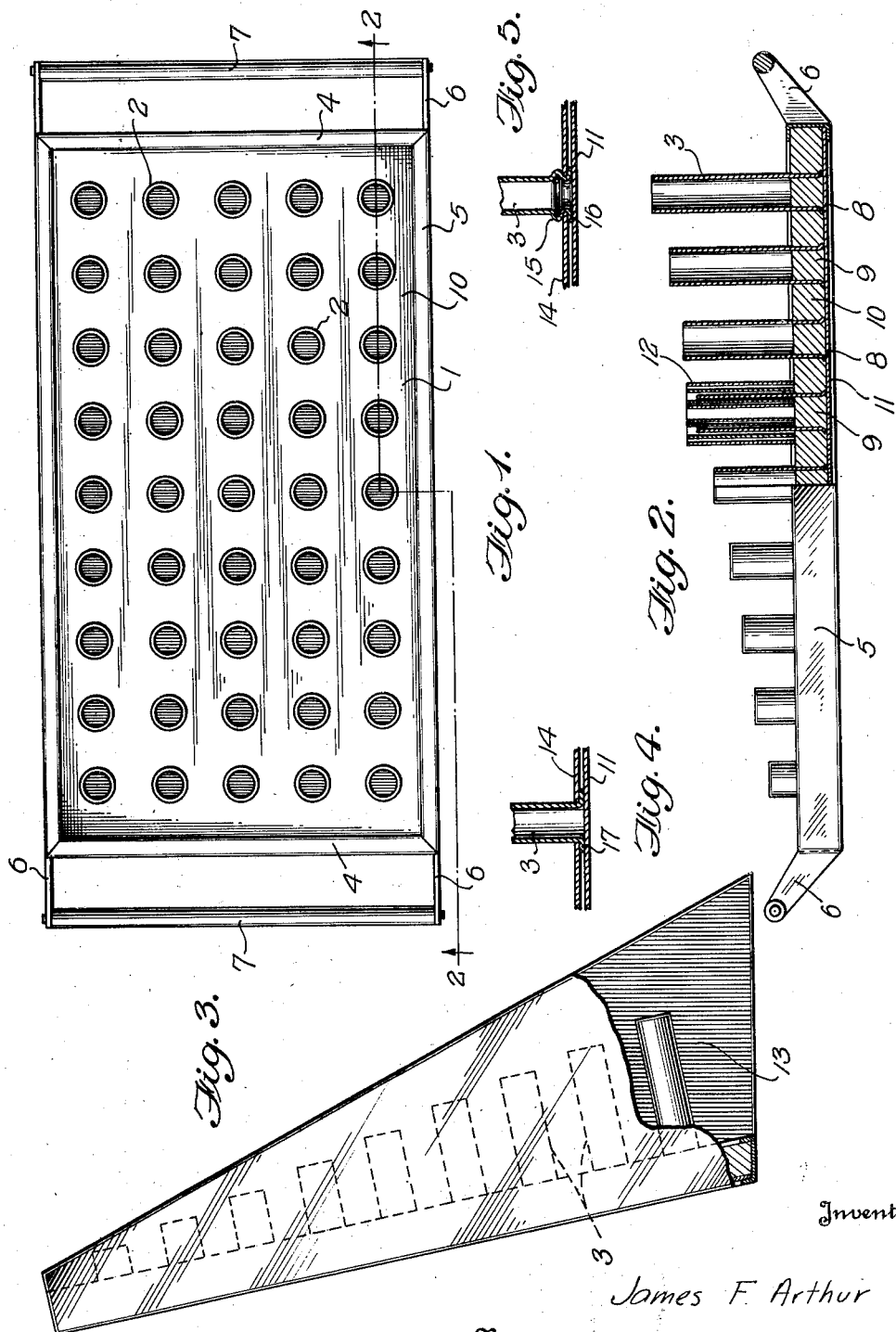
Inventor
James F. Arthur Patented Oct. 23, 1934

1,978,290

UNITED STATES PATENT OFFICE 1,978,290

RACK FOR SUPPORTING PIPE FITTING NIPPLES

James F. Arthur, Dickson City, Pa.

Application January 7, 1932, Serial No. 585,364

3 Claims. (Cl. 211—1)

My invention relates to cabinets or racks and more particularly to a rack for the purpose of supporting a plurality of pipe fitting nipples.

Hitherto, it has been necessary for pipe fitters and plumbers to use a box or similar container for the purpose of transporting and storing pipe fitting nipples. With the ordinary box or other receptacle, it is impossible to segregate and maintain the pipe fitting nipples in any classified order. By such means it is also difficult to check or account for the number and size of nipples which have been used. While racks having upright supports have been used for various purposes, they do not comprehend means for classifying pipe fitting nipples according to length and diameter.

An object of my invention is to provide a rack adapted to support pipe fitting nipples in nested arrangement.

Another object of my invention is to provide a rack wherein the nipples can be arranged according to size.

Yet another object of my invention is to provide a rack adapted to support various size nipples, so arranged that a nipple of a particular size, is readily accessible.

Still another object of my invention is to provide a pipe fitting nipple rack which is strong and sturdy in construction and designed to prevent injury to the nipple threads, where the nipples are placed upon the rack.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawing:

Figure 1 is a plan view of the rack.

Fig. 2 is a side view partly in section of the rack shown in Figure 1.

Fig. 3 is a side view of a modification of the rack; and

Figures 4 and 5 show modified arrangements of mounting the nipple supporting tubes.

Referring to the drawing and more particularly to Figures 1 and 2, there is shown a rack comprising a base 1 having a plurality of recesses 2, adapted to receive tubular members 3. The base may be formed of wood or metal, however, I prefer to use a wooden base because of its light weight and for the reason that this type of base protects the nipple threads when the nipples are placed over the tubular members, as will be described hereinafter.

The ends and sides of the base are protected by means of reenforcing metal strips, in the form of channel irons 4 and 5. The reenforcing pieces 5 along the sides of the rack, are formed with extensions 6 adapted to support handle 7 by means of which the rack may be carried.

The tubular members 3 are inserted into the recesses 2 and the ends of the tubes are bent over as at 8 thus securely holding the members in the base. In order to provide a substantial mounting for the tubes, the recesses may be bored so that the diameter of the recess is slightly less than the diameter of the tube, thus affording force fit for the tubes. The recesses 2 in the base may be filled with inserts 9 so that the level of the material within the tube may be the same as the portion 10 between each tube.

In order to protect the base of the rack and provide a smooth surface of support, a metallic plate 11 is mounted between the base and angle portions of reenforcing strips at the ends and sides of the rack.

Mounted upon the base and in nested relationship inside and outside of a tubular member, are a plurality of pipe fitting nipples 12. These nipples are of the same length, but vary in diameter according to standard pipe sizes. For example, the diameter of the nipples may range from $\frac{1}{8}$ inch to 2 inch inclusive, and all of the nipples in the same row will be of like range in diameter and of the same length. The nipples placed on the tubular members to the right and left of the row shown, will be graduated in length, thus providing a number of pipe fitting nipples of various lengths and diameters.

Referring to Figure 3, I have shown a modification, by means of which the rack is adapted to be supported on a floor or counter for display purposes. The rack is similar to the arrangement shown in Figures 1 and 2 except that the handle members are removed and side support pieces 13 are used to hold the rack in position. It will be noted that the tubular members are perpendicular to the base and that the side pieces are arranged so that the base is tilted at a small angle with respect to the vertical.

Referring to Figures 4 and 5, I have shown modifications of the nipple support tube mountings disclosed in Figure 2. In Figure 4, the end of the tube 3 is inserted through openings in a base plate 14, the end of the tube being bent over as at 17. Another arrangement for mounting the tube 3, as shown in Figure 5, consists in forming a bead 15 on the individual tubes, inserting the end of the tube through suitable openings in the base plate 14 and bending the end of the tube over as at 16. In each of the forms, the metallic plate 11, adapted to cover the ends of the tube is used, to provide a smooth surface of support.

While I have shown and described the preferred embodiment of my invention, I wish it to be understood that I do not confine myself to the precise details of construction herein set forth, by way of illustrations, as it is apparent that many changes and variations may be made therein, by those skilled in the art, without departing from the spirit of the invention, or exceeding the scope of the appended claims.

What is claimed is:

1. In a nipple rack, including a base, having tubular members seated in said recesses, the tubular members being graduated in length with respect to the length of the rack, and adapted to support a plurality of pipe fitting nipples arranged in nested relationship upon the tubular members, some of the nipples being positioned inside and others outside of said members.

2. In a nipple rack, including a base, having a plurality of recesses therein, vertical tubular members mounted in said recesses, the tubular members being arranged in spaced relationship and graduated in length with respect to the length of the rack, said tubular members being adapted to support a plurality of pipe fitting nipples in nested arrangement with the members, some of the nipples being positioned inside and others outside of said members.

3. A nipple rack comprising a substantially rectangular shaped base provided with reinforcing strips attached to the ends and sides thereof, said strips being formed from channel iron, the angle portions thereof extending over the top and bottom surfaces of the base, a bottom cover plate for the base, said plate being seated upon the lower angle portions of the strips at the ends and sides of the rack, said base having openings therein, tubular members seated in said openings adapted to support a plurality of pipe fitting nipples arranged in nested relationship upon said tubular members.

JAMES F. ARTHUR.